United States Patent [19]

Dubowik et al.

[11] Patent Number: 5,208,059

[45] Date of Patent: May 4, 1993

[54] DUAL TEXTURED FOOD PIECE FABRICATION METHOD

[75] Inventors: Jon M. Dubowik, Buzzards Bay; Karl T. Ulrich, Belmont; Michael A. Nemirow, Lancaster, all of Mass.

[73] Assignee: General Mills, Inc., Minneapolis, Minn.

[21] Appl. No.: 896,699

[22] Filed: Jul. 13, 1992

Related U.S. Application Data

[62] Division of Ser. No. 624,945, Dec. 10, 1990, Pat. No. 5,146,844.

[51] Int. Cl.$^5$ .............................................. A23P 1/00
[52] U.S. Cl. ................................. 426/512; 426/281; 426/282; 426/516
[58] Field of Search ............... 426/512, 514, 516, 274, 426/281, 282, 102; 99/450.6, 450.7; 425/233

[56] References Cited

U.S. PATENT DOCUMENTS 4,900,572 2/1990 Repholz et al. .................. 426/516

Primary Examiner—George Yeung
Attorney, Agent, or Firm—John A. O'Toole

[57] ABSTRACT

An apparatus (10) utilizing the present methods for fabricating dual textured food pieces is disclosed. Specifically, cavities (20) are formed in and defined by the inner surfaces (26) of first and second, circular plates (22,24). The cavities (20) are moved along a circuitous path by rotation of the plates (22,24). During the first portion of the circuitous path, the plates (22,24) abut and are pressed together by being sandwiched between a movable jaw (54) and a stationary jaw (52) and by rollers (38) rolling on the outer surfaces (28) of the plates (22,24). Two adjacent cavities (20) are simultaneously filled by a food injection manifold (42) with first and second food materials which are metered through pumps (72,74) each having two inlets (76,78) and two outlets (80,82). After being filled, the cavities (20) are cooled by an air manifold (44). During the second portion of the circuitous path, the plates (22,24) are separated by a wedge (40) which flexes the second plate (24) away from the first plate (22). The food pieces are allowed to fall by gravity between the separated plates (22,24), with any remaining food pieces being blown out of the cavities (20) by a piccolo tube (48). In the preferred form, the bottom of the cavities (20) are initially filled by the first food material, then the first food material is coextruded with a second food material, with the first food material encircling the second food material, and the first food material is finally extruded to fill the top of the cavities (20). The resulting dual textured food piece includes a hard outer shell portion and a softer inner core portion.

24 Claims, 2 Drawing Sheets

DUAL TEXTURED FOOD PIECE FABRICATION METHOD

This is a division of application Ser. No. 624,945, filed Dec. 10, 1990, now U.S. Pat. No. 5,146,844.

BACKGROUND

The present invention generally relates to apparatus and methods for fabricating food products, particularly to apparatus and methods for fabricating shaped food products, and more particularly to apparatus and methods for fabricating shaped, dual textured food products.

The sale of snack-type food products is a highly competitive business. In addition to the particular food components, color, flavor, and increasingly shapes and the play value of such shapes are important in the marketability of any particular food piece. For example, fruit-based snack products such as FRUIT CORNER'S TM fruit bit pieces are sold in variously shaped pieces such as animals, e.g. bears, sharks, and dinosaurs, and objects such as jets, airplanes, and rockets. While the basic food formulation from which such shaped, snack food pieces can remain relatively constant, the novelty and play value of the shapes in the marketplace decline rapidly. Consequently, new shapes are constantly being developed to replace existing shapes as those existing shapes lose their novelty and appeal.

Accordingly, in the development of apparatus for fabricating shaped, snack food items, it is imperative that the molds for forming shaped pieces be inexpensive to fabricate and replace and easy to install for rapid change of finished product shapes.

While shaped food pieces are known, such food pieces are homogeneous in composition and texture. While desirable, it would be even more desirable to provide a dual textured, shaped food piece. Recently, dual textured food compositions and snack food item articles prepared therefrom have been developed (see U.S. Pat. No. 4,847,098, issued Jul. 11, 1989 to J. E. Langler, and U.S. Pat. No. 4,853,236, issued Aug. 1, 1989 to J. E. Langler, each entitled Dual Textured Food Piece of Enhanced Stability and each incorporated herein by reference). Unfortunately, providing a shaped, dual textured food piece greatly increases the difficulty of developing apparatus for fabricating such pieces on an industrial scale.

Accordingly, it is an object of the present invention to provide novel apparatus and methods for food products, which in the preferred form are shaped, and which in the most preferred form are also dual textured.

Another object of the invention is to provide molds which in themselves are inexpensive to fabricate and which are easy to install and replace. In this regard, an aim of the invention is to allow replacement of existing food products shapes as they lose their novelty and appeal with new shapes as they are developed.

Yet another object of the invention is to provide increased speed of operation for maximizing the fabrication of food products. In this regard, the cavities are moved along a circuitous path where the cavities are filled with food material which is allowed to harden to form the food pieces and where the food pieces are removed from the cavities before they are again refilled. Further, in the preferred form, two cavities are simultaneously filled from a single source of food material.

Still further, another object of the invention is to fabricate dual textured food pieces where first and second food materials are coextruded in a manner where the first food material is hardened to form an outer shell portion which encircles and encloses a softer inner core portion formed by the second food material.

SUMMARY

Surprisingly, the above objectives can be satisfied in the field of food fabrication by providing, in the preferred form, apparatus and methods of food fabrication where a cavity formed in and defined by abutting inner surfaces of first and second plates is moved along a circuitous path having a first portion where the first and second plates are abutting together and where the cavity is filled with food material and with the path having a second portion where the first and second plates are spaced from each other allowing the removal of the hardened food piece from the cavity.

In other aspects of the present invention, apparatus and methods of simultaneously fabricating first and second food pieces are provided, where first and second cavities are cofilled by food material which passes through and is metered by the intermittent operation of a pump having first and second inlets in separate fluid communication with a single source of food material and having first and second outlets in respective communication with the first and second cavities.

In yet other aspects of the present invention, apparatus and methods of fabricating dual textured food pieces are provided, where first food material is initially extruded to fill the bottom of a cavity, then the first food material is coextruded with and encircles a second food material, and finally the first food material is extruded to fill the top of the cavity.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
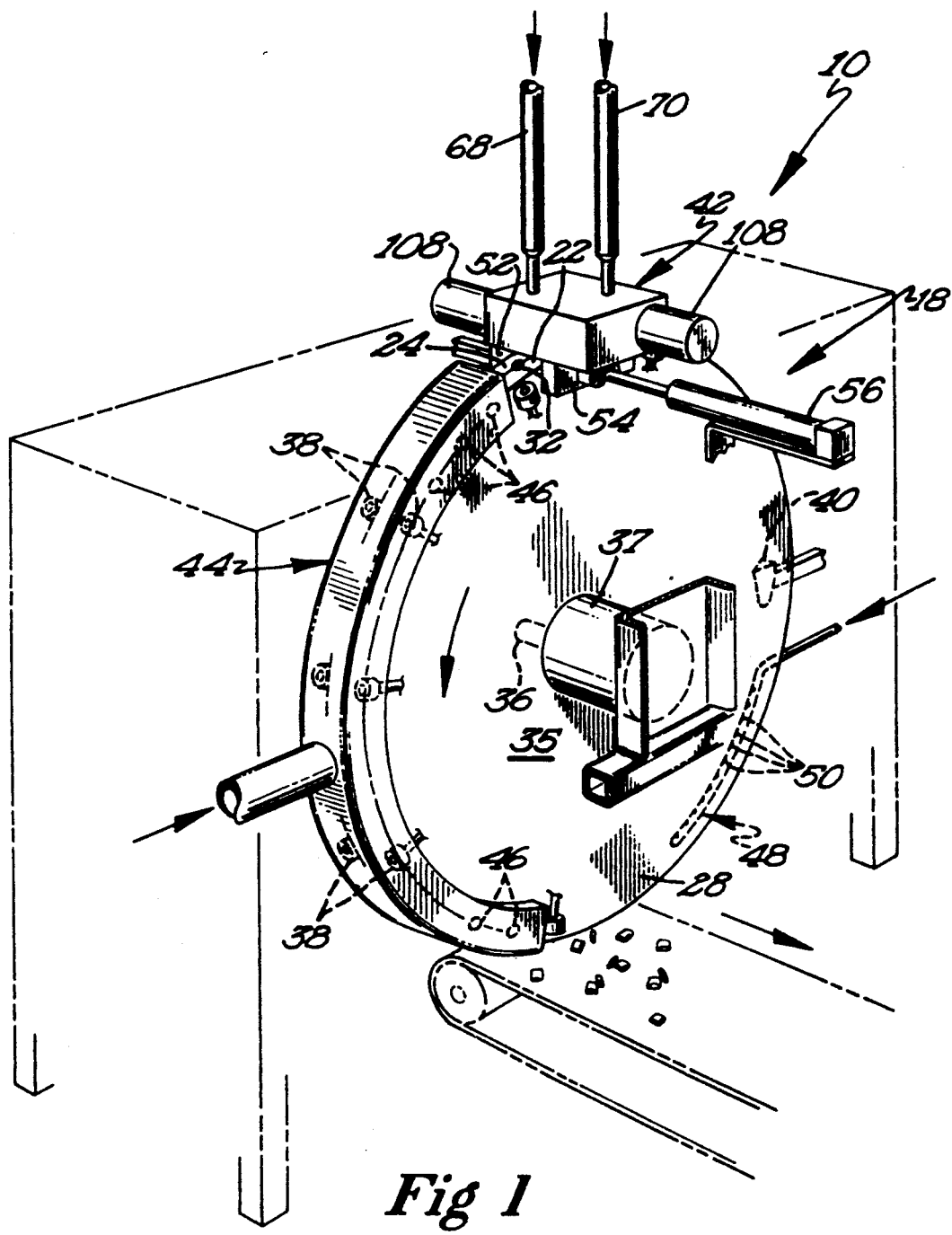
FIG. 1 shows a diagramatic, rear perspective view of an apparatus for fabricating a dual textured food piece according to the preferred teachings of the present invention, with the supporting structure being broken away to expose the internal components of the apparatus.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "inner", "outer", "axial", "radial", and similar terms are used herein, it should be understood that these terms have reference only to the structure shown in the drawings as it would appear to a person viewing the drawings and are utilized only to facilitate describing the invention.

DESCRIPTION

An apparatus utilizing the present methods for fabricating a shaped food piece, especially a dual textured food piece, according to the preferred teachings of the present invention is shown in the drawings and generally designated 10.

The shaped food pieces can be homogeneous in composition and structure. However, preferred apparatus embodiments find particular suitability for fabricating shaped, dual textured food pieces. In a highly preferred embodiment, the food piece can be of the type described in U.S. Pat. No. 4,847.098, issued Jul. 11, 1989 to J. E. Langler, and U.S. Pat. No. 4,853,236, issued Aug. 1, 1989 to J. E. Langler, each entitled Dual Textured Food Piece of Enhanced Stability and each of which is hereby incorporated herein by reference. Specifically, the food piece generally includes a first, solid or "hard" outer shell portion and a second, softer inner core portion.

Generally, apparatus 10 includes a molding device 18 having a plurality of mold cavities 20 formed in and defined by first and second mold plates 22 and 24. Specifically, mold plates 22 and 24 include inner surfaces 26 which face each other, outer surfaces 28 which are opposite to inner surfaces 26, outer edges 29, and inner edges 30 opposite to outer edges 29. In the preferred form, cavities 20 are formed by mold depressions extending from inner surfaces 26 of plates 22 and 24, with the peripheries of the depressions being mirror images at inner surfaces 26 of plates 20 and 22. Material access channels 32 are provided to cavities 20 such as by depressions formed in inner surfaces 26 of plates 22 and 24 and extending from cavities 20 outwardly towards and intersecting with outer edges 29 of plates 22 and 24. In the preferred form, the peripheries of the depressions forming channels 32 are mirror images at inner surfaces 26 of plates 22 and 24.

Cavities 20 may have any desired shape such as but not limited to dinosaurs, sharks, jets, airplanes, or like novelty shapes. The particular shape of food piece produced in apparatus 10 may be easily changed by interchanging plates 22 and 24 having cavities 20 of the desired shape. Further cavities 20 may be of different shapes in plates 22 and 24. For example, cavities 20 may have shapes of differing types of dinosaurs such that each revolution of plates 22 and 24 create a variety of shapes of food pieces.

The skilled artisan can appreciate that mold plates 22 and 24 can be fabricated with cavities 20 to provide finished articles of various shapes. For example, the shapes can be objects having an identical front and rear, e.g. a star or disc, or the shape can be more complex, involving a front and rear which are dissimilar, e.g. a front view of a bear and a rear view of a bear. In still another variation, the mold depressions can be mirror images providing left and right halves of a complex shape, e.g. a dinosaur.

Mold cavities 20 are advanced along a continuous, circuitous path which in the preferred form is generally in a single plane, especially a vertical plane, and particularly with inner surfaces 26 of plates 22 and 24 being generally vertical at all positions along the circuitous path. Specifically, in the preferred form, mold plates 22 and 24 are annular and particularly are circular in configuration. Plates 22 and 24 are advanced along the circuitous path by rotating plates 22 and 24 about the center of the circular shaped configuration. In the preferred form, circumferentially spaced and radially extending spokes 34 extend integrally and contiguously from inner edge 30 of plate 24 and converge towards and are secured to a shaft 36 located and extending through the center of the circular configuration of plate 24 to thus form a wheel-type arrangement. A solid, circular hub 35 extends integrally and contiguously from inner edge 30 of plate 22 and is secured to shaft 36 located and extending through the center of the circular configuration of plate 22 to thus form a wheel-type arrangement. The solid configuration of hub 35 acts as a guard to prevent passage of limbs or the like through spokes 34 of plate 24 which may abut against frame or other apparatus components when plates 22 and 24 are rotated. For ease of interchangability of cavities 20, spokes 34 and hub 35 may be removably secured to shaft 36 in any suitable manner to allow removal and replacement of plates 22 and 24 having cavities 20 of the desired shape to be fabricated. Likewise, plates 22 and 24 can be formed of two pieces, with cavities 20 being formed in replaceable and interchangeable mold portions removably secured to the remaining portions of plates 22 and 24.

In the preferred form, 60 mold cavities 20 are provided at equally spaced intervals around plates 22 and 24. Suitable drive means for intermittently rotating shaft 36 through angles corresponding to the spacing of cavities 20 may be provided such as by the use of a stepper motor 37.

Plates 22 and 24 are movable relative to each other and to shaft 36 between an abutting relation with inner surfaces 26 abutting to form cavities 20 during a first portion of the circuitous path and a separated relation with inner surfaces 26 of plates 22 and 24 spaced from each other during a second portion of the circuitous path. In the preferred form, plates 22 and 24, spokes 34, and/or hub 35 are formed of a flexible material, and in the highly preferred embodiment are formed of LEXAN TM polycarbonate plastic. It can then be appreciated that in the highly preferred embodiment, plate 24 moves away from and is spaced from plate 22 which generally remains in a single plane, with spokes 34 in the wheel arrangement for plate 24 providing a greater degree of flexibility than solid hub 35 utilized for plate 22.

A means for holding plates 22 and 24 in an abutting relation during the first portion of the circuitous path can be provided such as pairs of rollers 38 located on opposite sides of plates 22 and 24 for rolling on and pressing against outer surfaces 28 of plates 22 and 24. In the preferred form, the first portion of the circuitous path is defined by 6 sets of rollers 38 provided along about a 155° segment of plates 22 and 24 and particularly from a position intermediate the 12 o'clock and 1 o'clock position to a generally 7 o'clock position as viewed in FIG. 1.

A means for separating plates 22 and 24 during the second portion of the circuitous path such as a wedge 40 can be provided intermediate inner surfaces 26 of plates 22 and 24 and at a position opposite to the segment including rollers 38 defining the first portion of the circuitous path. Wedge 40 in the preferred form flexes plate 24 away from plate 22 to thus separate inner surfaces 26 of plates 22 and 24.

In a preferred form, a food material is heated to a temperature to which the food material is flowable or pumpable. The pumpable food material is then filled into cavities 20 generally at the initiation of the first portion of the circuitous path such as by an injection manifold 42, with the food material cooling and hardening in cavities 20 as they advance along the circuitous path. In the preferred form, food injection manifold 42 simultaneously fills two cavities 20 located on the opposite sides of the 12 o'clock position for increased speed of operation. Further, in the preferred form, food injection manifold 42 cofills or coextrudes cavities 20 with first and second food materials to form dual textured food pieces. Of course, in other useful embodiments, the present apparatus can be equipped with a food injection manifold which delivers only a single fluid food material such as in the preparation of a homogeneously textured food product. The preferred form of food injection manifold 42 will be set forth in more detail after the operation and features of molding device 18 have been explained.

In the most preferred form and in addition to rollers 38, the plate holding means may include means for exerting extra pressure against plates 22 and 24 opposite to and as cavities 20 are being filled to counteract any pressures created by the food material filling cavities 20 and to maintain plates 22 and 24 in an abutting relation at that point. Particularly, a stationary backing or anvil jaw 52 is arranged parallel to and generally abutting with outer surface 28 of plate 24. A complementary, movable jaw 54 is arranged parallel to outer surface 28 of plate 22 and opposite to jaw 52. Suitable means such as an air cylinder 56 is provided for moving jaw 54 between a first position and a second position. In the first position, jaw 54 is spaced from plate 22 such that plates 22 and 24 are freely rotatable past and between jaws 52 and 54. In the second position, jaw 54 abuts with and presses against plate 22 and thus sandwiches and clamps plates 22 and 24 intermediate jaws 52 and 54. With jaw 54 in its second position, cavities 20 may be filled in plates 22 and 24 with further assurance that the force exerted by the food material filling cavities 20 does not separate inner surfaces 26 of plates 22 and 24. Jaws 52 and 54 have a shape complementary to plates 22 and 24 and a size to abut on plates 22 and 24 a distance to extend over cavities 20 being filled by food injection manifold 42.

In a more preferred embodiment, the apparatus is provided with a means for cooling the filled cavities 20. This means for cooling provided assists cooling the heated food material in cavities 20 for hardening therein. In the preferred form, an air manifold 44 operatively connected to a pressurized, cool air supply (not shown) passes cooled, pressurized air over outer surfaces 28 of plates 22 and 24 opposite cavities 20 after cavities 20 have been filled by injection manifold 42 and at least during the first portion of the continuous path. In the most preferred form, air manifold 44 includes a plurality of openings 46 circumferentially spaced at locations and distances corresponding to the circumferential spacing of cavities 20 of plates 22 and 24 for directing cooled, pressurized air generally perpendicularly towards outer surfaces 28 of plates 22 and 24 opposite cavities 20.

The food material is cooled in cavities 20 by air manifold 44 during the first portion of the circuitous path to form the hardened food piece having the shape of cavities 20. During the second portion of the circuitous path, plates 22 and 24 are separated such as by wedge 40. In the preferred form with cavities 20 formed by depressions in both plates 22 and 24, the hardened food piece extends beyond inner surfaces 26 of plates 22 and 24. Further, in the preferred form with plates 22 and 24 being generally vertical, food pieces will fall by gravity out of the depressions in plates 22 and 24 forming cavities 20 as plates 22 and 24 are separated, with gravitational forces placing the food piece under torsional force for tipping out of the mold depressions in plates 22 and 24. When plates 22 and 24 have separated a distance generally equal to the size of the food piece, the food piece will fall from between plates 22 and 24 of molding device 18 such as onto a conveyor as shown for further processing such as packaging.

Depending upon the particular food material utilized to make the food piece, the food piece may have a sticky or adhesive force to adhere and remain in one of the depressions forming cavity 20 and which is sufficient to resist the food piece from falling therefrom by gravity. In those cases, molding device 18 should include a means for removing any food piece which remains in cavities 20 when plates 22 and 24 are separated in the second portion of the circuitous path and prior to reentry in the first portion of the circuitous path. In the most preferred form, an arcuate, piccolo tube 48 can be provided intermediate inner surfaces 26 of plates 22 and 24 when separated, generally parallel to inner edges 30 of plates 22 and 24, and radially inward of cavities 20. Tube 48 can be operatively connected to a source of pressurized air whether or not cooled but conveniently to the same cool air supply which supplies air manifold 42 such as by an inlet extending radially outwardly from tube 48 and intermediate inner surfaces 26 of plates 22 and 24. Tube 48 directs the moving, pressurized air radially outwardly and toward cavities 20 for blowing out any food pieces remaining in cavities 20. In the most preferred form, tube 48 includes a plurality of openings 50 circumferentially spaced at locations and distances corresponding to the circumferential spacing of cavities 20 of plates 22 and 24.

Suitable provisions can be included to prevent food injection manifold 42 from attempting to fill a cavity 20 in which a food piece remains. For example, with plates 22 and 24 formed of transluent material, a photodetector may be utilized to detect a nontranslucent food piece within cavity 20 and to prevent actuation of food injection manifold 42 for cavity 20 in which the food piece is detected.

For purposes of describing the operation of apparatus 10, a particular pair of cavities 20 will be followed along the continuous, circuitous path. In particular, the pair of cavities 20 will be assumed to be initially positioned in the first portion of the circuitous path and intermediate the first two sets of rollers 38 of the first portion of the circuitous path and below food injection manifold 42. Air cylinder 56 moves jaw 54 from its first position to its second position to sandwich plates 22 and 24 between jaws 52 and 54. While sandwiched between jaws 52 and 54, food injection manifold 42 fills the pair of cavities 20 with heated, pumpable food material. After the filling step has been completed, air cylinder 56 moves jaw 54 from its second position to its first position to space jaw 54 from plate 22, and shaft 36 is rotated 12° in the preferred form. The 12° rotation of shaft 36 moves plates 22 and 24 and the pair of cavities 20 from beneath food injection manifold 42 and in front of openings 46 of air manifold 44 where cooling air is directed toward outer surfaces 28 of plates 22 and 24 while the following pair of cavities 20 are being filled with the food material by food injection manifold 42. When the following pair of cavities 20 have been filled with food material, shaft 36 is again rotated 12° in the preferred form moving the pair of cavities 20 to the next pair of openings 46 of air manifold 44 thus permitting the succeeding pair of cavities 20 to be filled. This procedure is repeated until the pair of cavities 20 pass the last set of rollers 38 of the first portion of the circuitous path. At that time plates 22 and 24 enter the second portion of the circuitous path and begin to separate under the action of wedge 40. As the pair of cavities 20 continue to move at 12° intervals along the second portion of the circuitous path, surfaces 26 of plates 22 and 24 will be spaced a distance sufficient to allow the now cooled and hardened food piece to fall by gravity from cavities 20 between the vertically arranged, inner surfaces 26 of plates 22 and 24. As the pair of cavities 20 continue to move at 12° intervals along the second portion of the circuitous path, the pair of cavities 20 will be positioned radially outwardly of tube 48 where air from openings 50 will blow out any food pieces which remain in cavities 20 and which will also fall under gravitational forces from between the vertically arranged, inner surfaces 26 of plates 22 and 24. The pair of cavities 20 continue to move at 12° intervals along the second portion of the circuitous path toward the first portion of the circuitous path where plates 22 and 24 are again pressed into an abutting relation by the first set of rollers 38. When the pair of cavities 20 have been rotated through 30 intervals of 12°, i.e. one complete revolution, the pair of cavities 20 will be again positioned below food injection manifold 42 where the process may be repeated.

In the preferred form, two complete revolutions of plates 22 and 24 are made per minute such that 120 food pieces are fabricated per minute. It can then be appreciated that molding device 18 according to the teachings of the present invention allows food pieces to be economically mass produced in shapes.

Although wedge 40 is shown as the means for separating plates 22 and 24, other types and forms of means for separating plates 22 and 24 can be utilized according to the teachings of the present invention. For example, pins can be provided slideably mounted in one of plates 22 and 24 for abutment with the other of plates 22 and 24, with the pins being slid by camming on a stationary cam provided adjacent to plates 22 and 24 in the second portion of the circuitous path.

In the most preferred form, food injection manifold 42 coextrudes first and second food materials to form a dual textured food piece. Specifically, the first food material which forms the outer shell is initially extruded into cavity 20 to fill the bottom of cavity 20, the first and second food materials are then coextruded, with the first food material being extruded to encircle the second food material, and then the first food material is finally extruded into cavity 20 to fill the top of cavity 20. It can then be appreciated that the second food material is then totally enclosed by the first food material. When the first food material hardens, the first food material forms an outer shell portion enclosing the second food material forming an inner core portion. In the most preferred form, the second food material comprises approximately 10–30% of the food piece by weight, with the first food material comprising approximately 70–90% of the food piece by weight. Further, in the preferred form, the first food material is provided to food injection manifold 42 heated to a temperature in the order of 150°–180° F. (66°–82° C.) whereas the second food material is provided to food injection manifold 42 at a temperature range in the order of 50° F. (10° C.) to room temperature.

Figure 2:
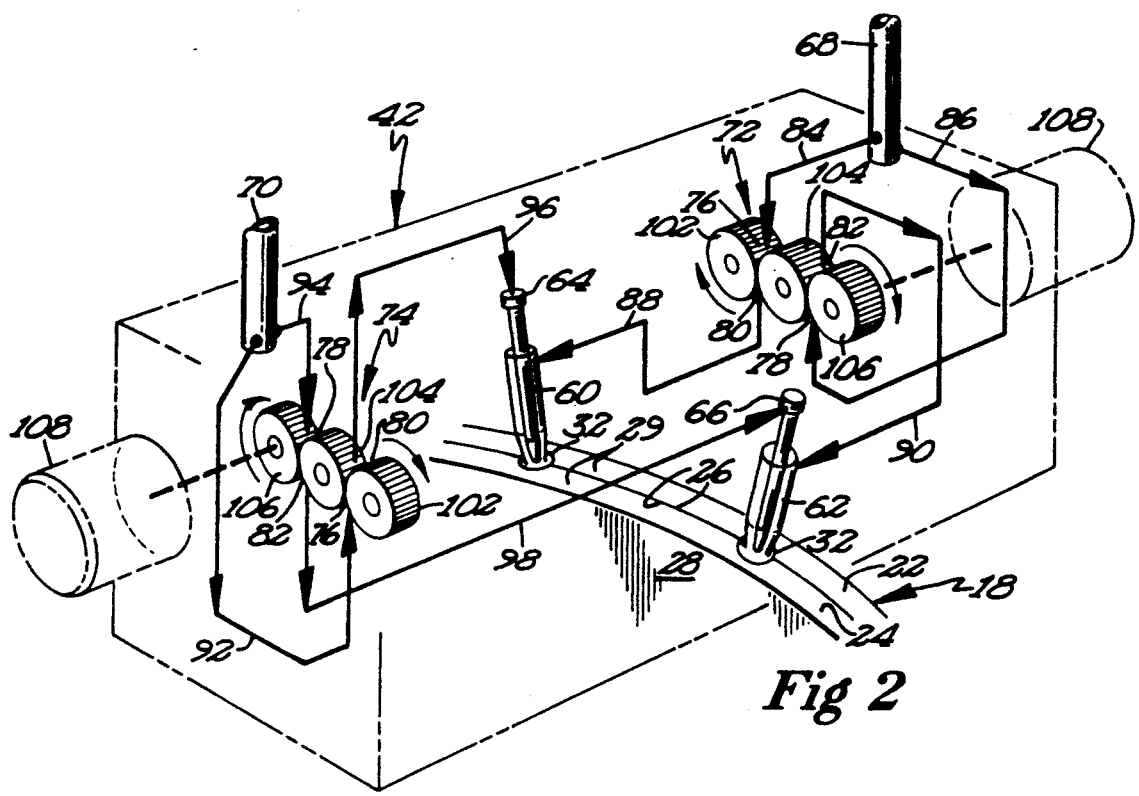
FIG. 2 shows a diagramatic, perspective view of a food injection manifold according to the preferred teachings of the present invention which can be utilized with the apparatus of FIG. 1.
Figure 3:
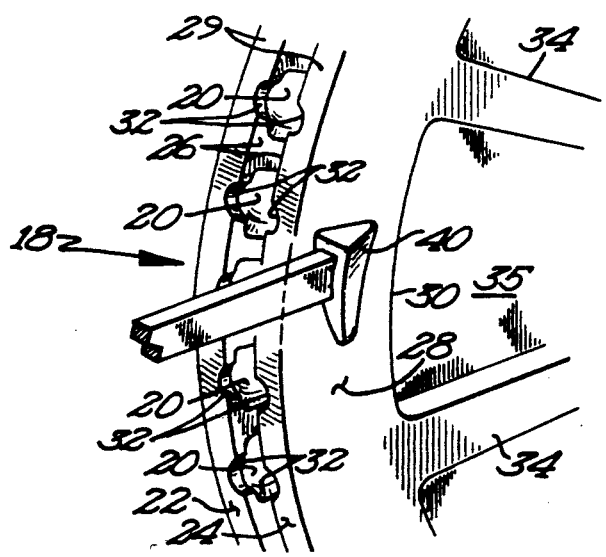
FIG. 3 shows a partial, enlarged, front perspective view of the apparatus of FIG. 1.

FIG. 2 shows a diagrammatic view of the most preferred form of food injection manifold 42 which can be utilized with molding device 18 according to the teachings of the present invention to form such a dual-textured food piece. Food injection manifold 42 generally includes first and second bores 60 and 62 which are circumferentially spaced and radially arranged to be diametrically aligned with plates 22 and 24 and specifically to be in fluid communication with access channels 32 of two, adjacent cavities 20. Hollow injection pins 64 and 66 in the form of hollow tubes are located concentrically within bores 60 and 62 and as such are also in fluid communication with access channels 32 through bores 60 and 62. A single inlet 68 is provided as a source of and for receiving the first food material under pressure. Similarly, a single inlet 70 is provided as a source of and for receiving the second food material, with the second food material being fed by gravity or under pressure.

Food injection manifold 42 further includes means for intermittently supplying bores 60 and 62 and injection pins 64 and 66 with the desired amount of food material from inlets 68 and 70 respectively. In the most preferred form, first and second food pumps 72 and 74 are provided, with each pump 72 and 74 having two inlets 76 and 78 and two outlets 80 and 82. Particularly, first and second conduits 84 and 86 are provided having first ends in fluid communication with inlet 68 and having opposite ends in fluid communication with inlets 76 and 78 of pump 72. A conduit 88 extends from outlet 80 of pump 72 to bore 60 and a conduit 90 extends from outlet 82 of pump 72 to bore 62. Further, first and second conduits 92 and 94 are provided having first ends in fluid communication with inlet 70 and having opposite ends in fluid communication with inlets 76 and 78 of pump 74. A conduit 96 extends from outlet 80 of pump 74 to injection pin 64 and a conduit 98 extends from outlet 82 of pump 74 to injection pin 66.

In the most preferred form, pumps 72 and 74 are of the gear type and particularly are ZENITH ™ dual outlet pumps. Specifically, pumps 72 and 74 include a first gear-like member 102 in gearing relation with a second gear-like member 104 in turn in gearing relation with a third gear-like member 106. In the preferred form, gear-like members 102, 104, and 106 are of the same diameter and length, with their rotational axes lying in a single plane. It can then be appreciated that due to the gearing relation, gear like members 102 and 106 rotate in the same direction while gear-like member 104 rotates in the opposite direction of gear-like members 102 and 106. Outlets 80 and 82 lie on the mating side of gear-like members 102 and 104 and of gear-like members 104 and 106 while inlets 76 and 78 lie on the exit side of gear-like members 102 and 104 and of gear-like members 104 and 106. Thus, inlet 76 lies on the opposite, axial side of outlet 80 and of inlet 78, with outlet 82 lying on the opposite, axial side of inlet 78 and of outlet 80. One or more of the gear-like members 106 of pumps 72 and 74 may be driven in an intermittant manner by any suitable manner such as by motor 108.

In operation of pumps 72 and 74, food material entering inlets 76 of pumps 72 and 74 must flow around the circumference of gear-like members 102 to outlet 80 or along the circumference of gear-like members 104 to outlet 82. Similarly, food material entering inlets 78 of pumps 72 and 74 must flow around the circumference of gear-like members 106 to outlet 82 or along the circumference of gear-like members 104 to outlet 80. Although pumps 72 and 74 are capable of pumping the food material, pumps 72 and 74 are utilized in a metering or valve mode as the food material is pressurized up to about 200 to 350 psi in inlets 68 and 70 in the most preferred form. Specifically, by rotating gear-like members 102, 104, and 106, passage of food material is allowed from inlets 76 and 78 to outlets 80 and 82 of pumps 72 and 74. Conversely, when gear-like members 102, 104, and 106 are stationary, passage of food material is prevented from inlets 76 and 78 to outlets 80 and 82 of pumps 72 and 74.

In operation of food injection manifold 42 with molding device 18, after plates 22 and 24 have been rotated into position with cavities 20 in alignment with bores 60 and 62 and injection pins 64 and 66, pumps 72 and 74 are intermittently operated to allow passage of the food material from inlets 68 and 70 to cavities 20. Specifically, motor 108 of pump 72 is actuated allowing the first food material to flow from inlet 68 through conduits 84 and 86 into inlets 76 and 78 of pump 72 and through outlets 80 and 82 of pump 72 through conduits 88 and 90 into bores 60 and 62 and into the aligned cavities 20. After the bottom of cavities 20 are filled with the desired amount of first food material, motor 108 of pump 74 is simultaneously actuated allowing the second food material to flow from inlet 70 through conduits 92 and 94 into inlets 76 and 78 of pump 74 and through outlets 80 and 82 of pump 74 through conduits 96 and 98 into injection pins 64 and 66 to then be coextruded into cavities 20 with the first food material flowing into cavities 20 through bores 60 and 62. After the desired amount of first and second food materials has been coextruded into cavities 20, actuation of motor 108 of pump 74 is stopped to thus stop pump 74 and prevent passage of the second food material from inlet 70 to injection pins 64 and 66 through pump 74. Pump 72 is continued to be operated to fill cavities 20 and encircle the second food material. When the desired amount of first food material has passed to fill cavities 20, actuation of motor 108 of pump 72 is also stopped to thus stop pump 72 and prevent passage of the food material from inlet 68 to bores 60 and 62 through pump 72. At that time, plates 22 and 24 may be rotated into the next position with the next pair of cavities 20 in alignment with bores 60 and 62 and injection pins 64 and 66, and the process may be repeated.

It can be appreciated that food injection manifold 42 ensures that the appropriate amounts of food material are metered at the appropriate times. Undesirable amounts or timing of food material may result in defective products such as but not limited to the possibility of insufficient thickness of the outer shell portion to contain the inner core portion. Similarly, it can be appreciated that the annular space between the inside diameters of bores 60 and 62 and the outside diameters of injection pins 64 and 66 and that the spacing of the lower ends of injection pins 64 and 66 from the lower ends of bores 60 and 62 or in other words cavities 20 of molding device 18 be sufficient to ensure the outer shell portion has sufficient thickness to contain the inner core portion.

Furthermore, it can be appreciated that food injection manifold 42 ensures that the food material is divided from a single source to two, separate cavities. Thus, food injection manifold 42 allows increased speed of operation without requiring multiple feeding systems.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A method for fabricating a food piece, comprising the steps of: providing a first plate having an inner surface; providing a second plate having an inner surface; moving the first and second plates along a circuitous path with the circuitous path having a first portion with the inner surfaces of the first and second plates abutting and a second portion with the inner surfaces of the first and second plates being spaced from each other, with at least a first cavity being formed in and defined by the abutting inner surfaces of the first and second plates; filling the cavity with at least a first food material in the first portion of the circuitous path to harden in the cavity while the first and second plates are in the first portion of the circuitous path; and removing the hardened food piece from the cavity when the first and second plates are in the second portion of the circuitous path.

2. The method of claim 1 wherein the step of providing the first plate comprises the step of providing the first plate having a circular shape including a center; wherein the step of providing the second plate comprises the step of providing the second plate having a circular shape including a center; and wherein the step of moving the first and second plates comprises the step of rotating the first and second plates about an axis extending through the centers of the circular shapes of the first and second circular plates.

3. The method of claim 1 wherein the inner surfaces of the first and second plates are vertical in the second portion of the circuitous path; and wherein the removing step comprises the step of allowing the food piece to fall intermediate the inner surfaces of the first and second plates under gravitational forces.

4. The method of claim 3 further comprising the step of supplying moving air in the second portion of the circuitous path to blow the food piece from the cavity.

5. The method of claim 1 further comprising the step of cooling the food piece in the cavity in the first portion of the circuitous path.

6. The method of claim 5 wherein the step of providing the first plate comprises the step of providing the first plate having an outer surface opposite to the inner surface; wherein the step of providing the second plate comprises the step of providing the second plate having an outer surface opposite to the inner surface; and wherein the cooling step comprises the step of directing cooled air towards the outer surfaces of the first and second plates opposite to the cavity.

7. The method of claim 1 wherein the filling step comprises the step of cofilling the cavity with first and second food materials to form a dual textured piece.

8. The method of claim 7 wherein the step of cofilling the cavity comprises the steps of: initially extruding the first food material to fill the bottom of the cavity; coextruding the first and second food materials, with the first food material being extruded to encircle the second food material; and finally extruding the first food material to fill the top of the cavity.

9. The method of claim 7 wherein a second cavity is formed in and defined by the abutting inner surfaces of the first and second plates; and wherein the step of filling the cavity comprises the step of simultaneously filling the first and second cavities with the food material.

10. The method of claim 9 wherein the step of simultaneously filling the first and second cavities comprises the steps of: providing a source of food material under pressure; providing a pump having a first inlet, a second inlet, a first outlet, and a second outlet; providing communication of the food material between the first inlet of the pump and the source of food material; providing communication of the food material between the second inlet of the pump and the source of food material; providing communication of the food material between the first outlet of the pump and the first cavity; providing communication of the food material between the second outlet of the pump and the second cavity; and intermitently operating the pump to allow passage of the food material from the source of food material to the first and second cavities.

11. The method of claim 1 wherein a second cavity is formed in and defined by the abutting inner surfaces of the first and second plates; and wherein the step of filling the cavity comprises the step of simultaneously filling the first and second cavities with the food material.

12. The method of claim 11 wherein the step of simultaneously filling the first and second cavities comprises the steps of: providing a source of food material under pressure; providing a pump having a first inlet, a second inlet, a first outlet, and a second outlet; providing communication of the food material between the first inlet of the pump and the source of food material; providing communication of the food material between the second inlet of the pump and the source of food material; providing communication of the food material between the first outlet of the pump and the first cavity; providing communication of the food material between the second outlet of the pump and the second cavity; and intermitently operating the pump to allow passage of the food material from the source of food material to the first and second cavities.

13. The method of claim 1 wherein the step of providing the first plate comprises the step of providing the first plate having the inner surface and an outer surface opposite to the inner surface; wherein the step of providing the second plate comprises the step of providing the second plate having the inner surface and an outer surface opposite to the inner surface; and wherein the step of moving the first and second plates includes the step of pressing against the outer surfaces of the first and second plates during the first portion of the circuitous path.

14. The method of claim 13 wherein the pressing step comprises the steps of: rolling a first roller on the outer surface of the first plate; and rolling a second roller on the outer surface of the second plate and spaced a distance from the first roller for pressing the first and second plates together.

15. The method of claim 13 wherein the pressing step comprises the steps of: moving the outer surface of the second plate past a stationary jaw; moving the outer surface of the first plate past a movable jaw; and moving the movable jaw to sandwich the first and second plates together during the step of filling the cavity and moving the movable jaw away from the first plate to allow movement of the first and second plates relative to the stationary and movable jaws.

16. The method of claim 7 wherein the step of providing the second plate comprises the step of providing the second plate formed of flexible material; and wherein the moving step comprises the step of flexing the second plate away from the first plate to space the inner surfaces of the first and second plates from each other during the second portion of the circuitous path.

17. The method of claim 16 wherein the step of flexing the second plate comprises the step of wedging the second plate away from the first plate.

18. A method of fabricating a shaped, dual textured food piece, comprising the steps of: providing at least a first cavity having a shape of the food piece, with the cavity having a bottom and a top; providing a first, hardenable, food material; providing a second food material; initially extruding the first food material to fill the bottom of the cavity; coextruding the second food material with the first food material into the cavity, with the first food material being extruded to encircle the second food material; finally extruding the first food material to fill the top of the cavity; hardening at least the first food material in the cavity to form the food piece; and removing the food piece from the cavity.

19. The method of claim 18 wherein the second food material forms a softer, inner core portion than the hardened, first food material which forms a hard, outer shell portion.

20. The method of claim 18 wherein the step of providing the first, hardenable, food material comprises the step of providing a source of the first, hardenable, food material under pressure; wherein the steps of extruding the first, hardenable, food material comprises the steps of: providing communication of the first, hardenable, food material from the source of the first, hardenable, food material to the first inlet of a first pump; providing communication of the first, hardenable, food material from the outlet of the first pump to the first cavity; and operating the first pump to allow passage of the first, hardenable, food material from the source of the first, hardenable, food cavity to the first cavity through the first pump; and wherein the step of providing the second food material comprises the step of: providing a source of the second food material under pressure; and wherein the step of extruding the second food material comprises the steps of: providing communication of the second food material from the source of the second food material to the first inlet of a second pump; providing communication of the second food material from the outlet of the second pump to the first cavity; and operating the second pump to allow passage of the second food material from the source of the second food material to the first cavity through the second pump.

21. The method of claim 18 further comprising the step of providing at least a second cavity having a shape of the food piece, with the second cavity having a bottom and a top; with the initially extruding step comprising the step of initially extruding the first, hardenable, food material to simultaneously fill the bottom of the first and second cavities; wherein the coextruding step comprises the step of coextruding the second food material with the first food material simultaneously into the first and second cavities; and the finally extruding step comprises the step of finally extruding the first food material to simultaneously fill the tops of the first and second cavities.

22. The method of claim 21 wherein the step of providing the first, hardenable, food material comprises the step of providing a source of the first, hardenable, food material under pressure; wherein the steps of extruding the first, hardenable, food material comprises the steps of: providing communication of the first, hardenable, food material from the source of the first, hardenable, food material to the first inlet of a first pump; providing communication of the first, hardenable, food material from the source of the first, hardenable, food material to the second inlet of the first pump; providing communication of the first, hardenable, food material from the first outlet of the first pump to the first cavity; providing communication of the first, hardenable, food material from the second outlet of the first pump to the second cavity; and operating the first pump to allow simultaneous passage of the first, hardenable, food material from the source of the first, hardenable, food material to the first and second cavities through the first pump; and wherein the step of providing the second food material comprises the step of: providing a source of the second food material; and wherein the step of extruding the second food material comprises the steps of: providing communication of the second food material from the source of the second food material to the first inlet of a second pump; providing communication of the second food material from the source of the second food material to the second inlet of the second pump; providing communication of the second food material from the first outlet of the second pump to the first cavity; providing communication of the second food material from the second outlet of the second pump to the second cavity; and operating the second pump to allow passage of the second food material from the source of the second food material to the first and second cavities through the second pump.

23. The method of claim 18 wherein the step of providing a first, hardenable food material comprises the steps of: providing a food material; and heating the food material to a temperature to which the food material is flowable; and wherein the hardening step comprises the step of cooling the cavity to reduce the temperature of the first, hardenable, food material to that required to harden the food material to a solid state.

24. A method of simultaneously fabricating two food pieces, comprising the steps of: providing at least first and second cavities; providing a source of food material under pressure; providing a pump having a first inlet, a second inlet, a first outlet, and a second outlet; providing communication of the food material between the first inlet of the pump and the source of food material; providing communication of the food material between the second inlet of the pump and the source of food material; providing communication of the food material between the first outlet of the pump and the first cavity; providing communication of the food material between the second outlet of the pump and the second cavity; and intermitently operating the pump to allow passage of the food material from the source of food material to the first and second cavities.

* * * * *